Dec. 12, 1961    A. ASHKIN ET AL    3,013,218
MOLECULAR BEAM MASER
Filed May 14, 1959    2 Sheets-Sheet 1
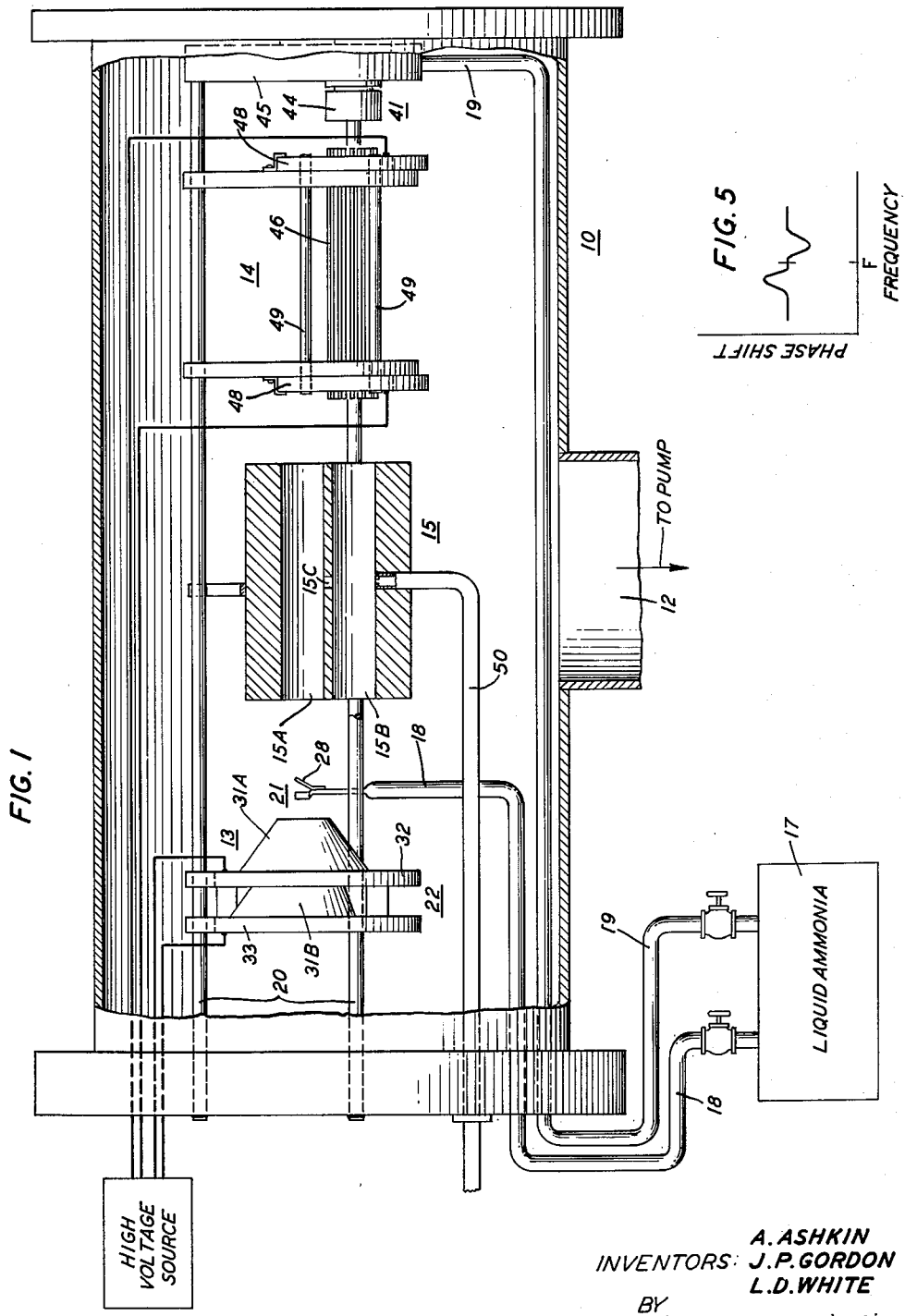
INVENTORS: A. ASHKIN
J. P. GORDON
L. D. WHITE
BY
Arthur J. Torsiglieri
ATTORNEY Dec. 12, 1961  A. ASHKIN ET AL  3,013,218
MOLECULAR BEAM MASER
Filed May 14, 1959  2 Sheets-Sheet 2
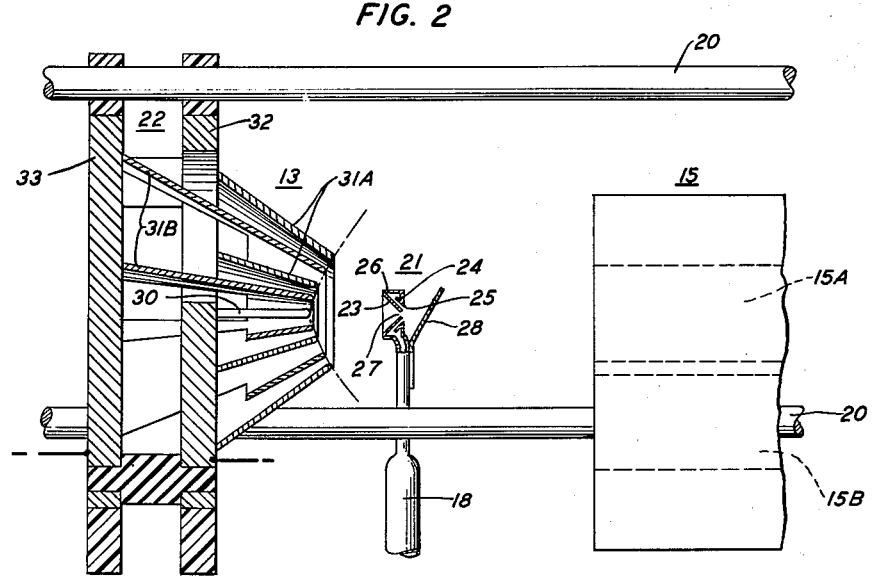
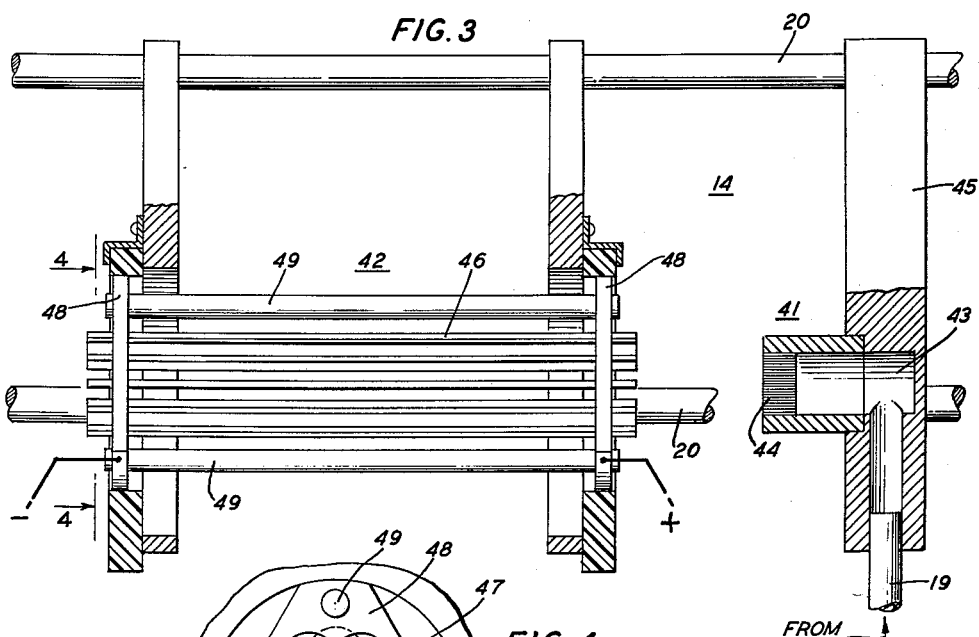
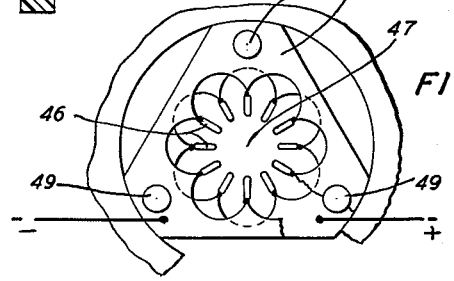
INVENTORS A. ASHKIN
J. P. GORDON
L. D. WHITE
BY Arthur J. Torsiglieri
ATTORNEY United States Patent Office
3,013,218
Patented Dec. 12, 1961

3,013,218
MOLECULAR BEAM MASER
Arthur Ashkin, Bernardsville, James P. Gordon, Chatham, and Lowell D. White, Morris Township, Morris County, N.J., assignors to Bell Telephone Laboratories, Incorporated, New York, N.Y., a corporation of New York
Filed May 14, 1959, Ser. No. 813,217
7 Claims. (Cl. 331—94)

This invention relates to molecular beam masers.

An object is a molecular beam maser improved from the standpoint of frequency stability and/or resolution.

Molecular beam masers are now well known in the art. A discussion of the principles of operation can be found in a paper appearing in the Physical Review, volume 99, pages 1264–1274 (1955). In such a maser, a suitable source provides a stream of molecules, typically of ammonia, which is passed through a focuser for selectively eliminating the molecules of the lower state of the various pairs of the inversion resonance, thereby forming a beam of molecules of the upper or excited states. This beam thereafter passes into a cavity tuned to the frequency of one of the inversion resonances whereby energy of such frequency is given up by the beam to the cavity, and oscillations of such frequency are established.

Various factors govern the stability of the frequency of oscillations. An important factor is the length of time the molecules take to traverse the cavity, the longer the transit time the more stable the frequency. Accordingly, in the interest of frequency stability, it is desirable that the velocity of the molecules in the stream be slow to lengthen their time of transit through the cavity.

Accordingly, a subsidiary object of the invention is an arrangement for providing a beam of slow molecules for passage through the cavity.

To this end, in one aspect the invention provides a source which produces a stream of molecules of which a relatively large fraction are "slow" molecules. In particular, the source is designed to favor production of molecules each of whose velocity has been slowed by molecular collisions from a considerably higher velocity.

Additionally, to this same end in another aspect the invention also provides an arrangement which focuses the slow molecules of the upper states of the various pairs of the inversion resonances selectively into a beam.

However, one difficulty with the use of a beam composed substantially entirely of slow molecules of the kind described is that the density of such a beam typically is apt to be quite low, and is relatively difficult to sustain oscillations of appreciable amplitude solely with such a beam.

To this end, a subsidiary object of the invention is an arrangement to make more feasible the use of a beam of slow molecules. In particular, in another aspect, the invention involves utilizing two molecular beams, one of slow molecules for serving primarily as a frequency control, and the other to be termed the fast beam, including a normal distribution of velocities for serving as the main source of emitted energy. Advantageously, each of the two beams is supplied to a different chamber of a two chamber cavity, the strength of the two beams being adjusted so that the fast beam alone is just short of being able to sustain oscillations and the slow beam makes up the deficiency.

The invention will be better understood from the following more detailed description, taken in conjunction with the accompanying drawing, in which:

FIG. 1 is a longitudinal view partly in section and partly cut open of a molecular beam maser in accordance with the invention;

FIGS. 2 and 3 each show in more detail different portions of the maser shown in FIG. 1;

FIG. 4 shows a section taken along the lines 4—4 of FIG. 3; and

FIG. 5 shows the characteristic desired for the cavity included in the maser shown.

In the interest of simplicity, some of the details unessential to an understanding of the inventive contributions have been omitted and others shown in simplified form in the drawing. In particular, for example, it is generally advantageous to include a surface kept cooled by liquid nitrogen in the maser envelope to facilitate achieving a suitably low pressure in the envelope.

With reference now more specifically to the drawing, the ammonia maser 10 shown in FIG. 1 includes an envelope 11, typically metallic, which is kept evacuated by a suitable pump connected to outlet 12. At the opposite ends of the envelope are positioned the two molecular guns 13, 14 and intermediate therebetween is a cavity 15 which is provided with two chambers 15A, 15B coupled together by opening 15C. A tank 17 of liquid ammonia external to the envelope serves as the source of ammonia vapor. The ammonia vapor is led from the tank into the envelope by the pipes 18 and 19, pipe 18 supplying gun 13 and pipe 19 supplying gun 14. The various elements are supported in the envelope by the metallic support rods 20.

The molecular gun 13 is shown in greater detail in FIG. 2. It includes the emitter 21 and the focuser 22 and is positioned to pass a molecular beam through chamber 15A of the cavity 15. The emitter 21 is adapted to favor emission toward the focuser 22 of a beam which includes a high proportion of slow molecules. To this end, the emitter which has circular symmetry is bounded in part by two conical surfaces 23, 24 which form between them an annular opening 25 facing the cavity 15. The remainder of the emitter is bounded by plate 26. The emitter is supplied with ammonia vapor by the pipe 18.

The emitter is designed so that in operation molecules of thermal velocities exit from the annular opening 25 with their directions fixed by the channel walls. Such molecules collide with one another in the region in front of the central opening 27 and any slow molecules resulting from such collisions predominantly are directed toward the focuser 22 passing through the opening 27 while the fast molecules resulting are predominantly directed toward the cavity 15. A disc 28 is positioned to intercept such fast molecules and prevent their entrance into the cavity 15.

The focuser 22 is designed both to separate from the molecules emitted toward it the slow molecules which are in the upper excited states of the pairs of the inversion resonances of the ammonia molecules and additionally to focus such slow molecules into a beam directed at chamber 15A of the cavity 15. To this end, the focuser is designed to provide an inhomogeneous electric field whose shape is that of a paraboloid of revolution of which the effective source of the molecules, the region in front of central opening 27 of the emitter, serves as the focal point. Slow molecules in the excited state are reflected and focused by such an inhomogeneous field while the rest of the molecules will either pass through the focuser or be scattered. In particular, the focuser will tend to focus only molecules whose velocities are less than about one-tenth the most probable velocity characteristic of the normal distribution of velocities in the gas at the temperature of operation, which is typically close to room temperature. Such molecules are the "slow" molecules.

To achieve the desired field shape, the focuser comprises an axial electrode 30, and an array of coaxial electrodes 31 each a conical section. The front edges of the electrodes are evenly spaced on a paraboloid of revolution having the effective source of the slow molecules at its focal point. The electrodes are divided into two sets of alternate electrodes. Each electrode of set 31A is maintained at a suitably high positive potential while each electrode of the set 31B is maintained at a suitably high negative potential whereby a high potential difference exists between adjacent electrodes. To facilitate application of the required potentials, the electrodes of set 31A are attached to plate 32 and the electrodes of set 31B are attached to plate 33. The two plates are insulated from one another and plate 32 is suitably apertured for passage therethrough of portions of the electrodes of set 31B by which such electrodes are attached to plate 33.

The molecular gun 14 which is positioned at the other end of the envelope advantageously is of conventional design to provide a molecular beam which includes both fast and slow molecules in the excited states. It is shown in greater detail in FIG. 3. It includes an emitter 41 adapted to emit molecules with a full range of velocities and a focuser 42 which disperses the molecules in the lower energy states and focuses the molecules in the excited states for passage through chamber 15B of the cavity 15.

The emitter 41 comprises simply a section of circular pipe 43 open at one end for emission of ammonia molecules and supplied with ammonia vapor by pipe 19 from the tank 17. The emitting end of pipe 43 is provided with a honeycomb insert 44 to form a multichannel opening to provide a partial directivity to the ammonia molecules which emerge. The emitter assembly is supported from rods 20 by the support plate 45.

The focuser 42 comprises an array of a suitable number of parallel electrodes 46, for example twelve, arranged to define a cylindrical passage 47 through which the focused molecules pass. Alternate electrodes of the array are maintained at the same potential but adjacent electrodes are at different potentials whereby an inhomogeneous electric field is established in the cylindrical passage. The various electrodes are supported by the assembly of end plates 48 and rods 49 from the rods 20.

As appears in FIG. 1, the cavity 15 comprises two chambers 15A, 15B each comprising a right circular cylinder open at its ends. Each chamber is resonant at the frequency corresponding to a particular one of the inversion resonances of the ammonia molecule. Advantageously, there is utilized the $J=3$, $K=3$, line for which the inversion resonance is at 23.87 kilomegacycles. The two sections are coupled together by coupling aperture 15C. Advantageously, the degree of coupling, i.e., the size of the aperture, is adjusted so that the phase shift-versus-frequency characteristic of the cavity is as shown in FIG. 5, the frequency F being the frequency of the desired inversion resonance. This makes the frequency of oscillations relatively independent of the temperature of the cavity. Provision not shown may be made for tuning the two sections separately.

As discussed, the cavity is disposed relative to the two molecular guns so that the beam provided by the gun 13 passes through cavity section 15A and the beam provided by the gun 14 passes through cavity section 15B. Oscillatory energy set up in the cavity is abstracted for utilization by the wave guide 50 which leads from chamber 15B of the cavity to form an external connection.

The strength of the beam provided through cavity section 15B is adjusted to be just short of that necessary to sustain oscillations in the cavity in the absence of any flow through cavity section 15A. The strength of the beam passed through the cavity section 15A is adjusted so that sustained oscillations arise in cavity section 15B. The resulting oscillations will have their frequency controlled by the characteristics of the energy emitted in cavity section 15A. By way of analogy, the cavity section 15B may be considered a broad band amplifier which is coupled to a narrow band amplifier represented by cavity section 15A. The resulting characteristic is determined by the region of overlap of the two individual characteristics.

It will be obvious that various modifications are possible in the basic arrangement described without departing from the spirit and scope of the invention.

First, gases other than ammonia or lines other than the 3—3 ammonia maser may be employed in the manner described.

Moreover, various other forms of molecular sources may be employed. In particular, a molecular beam consisting largely of slow molecules may be obtained by a source formed as a thin flat cylinder apertured at each of its two faces.

Additionally, various other arrangements may be devised to provide an electric field having the shape of a paraboloid of revolution. In particular, a series of rings with appropriate potentials thereon may be used, a different ring being substituted for the active ends of the conical electrodes in the arrangement of FIG. 1.

It is, of course, feasible to orient the beam emitted by the emitter so that it is incident on a section of a paraboloid of revolution which does not include the axis of revolution. Such an arrangement would provide a beam whose axis is parallel to but displaced from the axis of revolution.

Additionally, various forms of cavities may be used. In particular, it is feasible to utilize a cavity having only a single chamber into which both beams are passed, preferably for example, a conventional cylindrical cavity open at its two ends for entrance of the two beams at opposite open ends.

It is, of course, unnecessary to incorporate into a single molecular maser all of the novel features described.

What is claimed is:

1. A molecular beam maser comprising means providing a first beam of molecules whose velocities have a normal distribution and are in an excited state with a characteristic inversion frequency, means providing a second beam consisting essentially of slow molecules of the same species as the first beam and in an excited state with said characteristic inversion frequency, a cavity resonant at said inversion frequency and positioned in the paths of said beams and apertured for entrance therein of said beams whereby oscillations of the inversion frequency are established in the cavity, and means for abstracting said oscillations from the cavity for utilization.

2. A molecular beam maser in accordance with claim 1 in which the strengths of the individual beams are such that an individual beam alone is unable to sustain oscillations in the cavity but the two beams together are able to sustain oscillations in the cavity.

3. A molecular beam maser in accordance with claim 2 in which the means for providing the beam consisting essentially of slow molecules includes means emitting molecules with a normal distribution of velocities and means for separating therefrom and selectively focusing for passage through the cavity only the slow molecules in the excited state with said characteristics inversion frequency.

4. A molecular beam maser in accordance with claim 2 further characterized in that the cavity comprises two sections coupled together and the first beam is introduced selectively into one section and the second beam is introduced selectively into the other section.

5. A molecular beam maser comprising means providing a first beam of molecules having a normal distribution of velocities and in an excited state with a characteristic inversion frequency, means in accordance with claim 12 for providing a second beam of slow molecules of the same species as the molecules of the first beam and in an excited state with said inversion frequency, a cavity having two sections and resonant at said inversion frequency, its first section positioned in the path of said first beam for entrance therein of said first beam, its second section positioned in the path of said second beam for entrance therein of said second beam, the strengths of the two beams being such that each alone is unable to sustain oscillations in the cavity, while the two beams together can sustain oscillations at the inversion frequency in the cavity, and means for abstracting said oscillations from the cavity for utilization.

6. An arrangement for providing a beam of slow molecules in an excited state comprising a source of molecules whose velocities have a normal distribution and means for separating therefrom and selectively focusing into a beam only the molecules whose velocities are less than about one-tenth the most probable velocity characteristic of said normal distribution, said means comprising an axial electrode and an array of coaxial electrodes, the front edges of said electrodes being evenly spaced on a paraboloid of revolution having the source of the molecules at its focal point.

7. A molecular beam gas maser comprising means for providing a beam of molecules which are in an excited state with a characteristic inversion frequency and whose velocities are less than about one-tenth the most probable velocity characteristic of the normal distribution of velocities in the gas at the temperature of operation and for excluding molecules of greater velocities from the beam, a cavity resonant at said inversion frequency and positioned in the path of said beam for entrance therein of said beam whereby oscillations of said inversion frequency are established in the cavity, and means coupled to the cavity for extracting the oscillatory energy for utilization.

References Cited in the file of this patent
UNITED STATES PATENTS

| | | |
|---|---|---|
| 2,658,009 | Ransburg | Nov. 3, 1953 |
| 2,684,453 | Hansell | July 22, 1954 |
| 2,879,439 | Townes | Mar. 24, 1959 |
| 2,921,269 | Reder | Jan. 12, 1960 |

OTHER REFERENCES

Twin Cavity for $NH_3$ Masers, by Bonanomi et al., in Review of Scientific Instruments, pages 879, 881, November 1957.